Jan. 8, 1935.    G. E. NERNEY    1,987,206
EYEGLASS CONSTRUCTION
Filed July 26, 1930
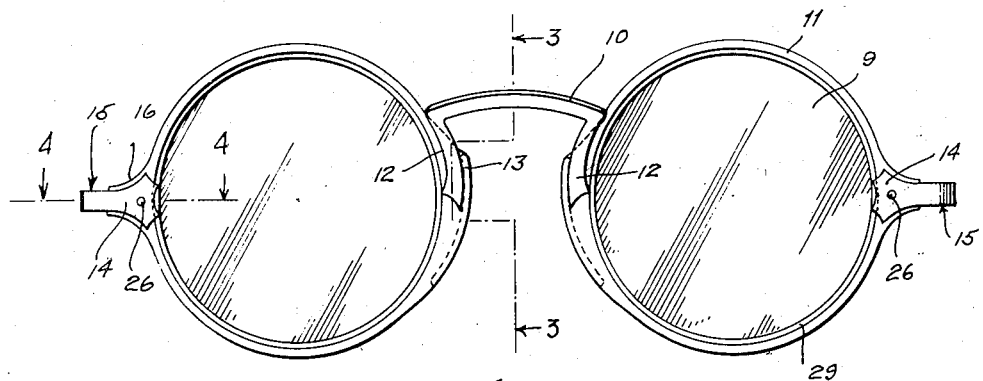
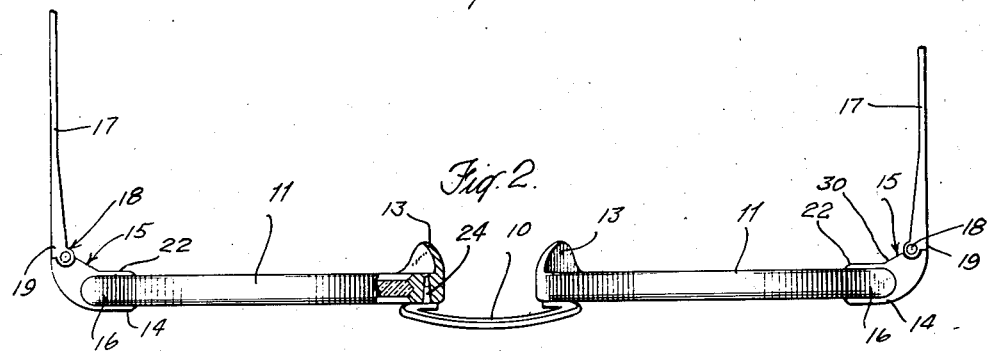
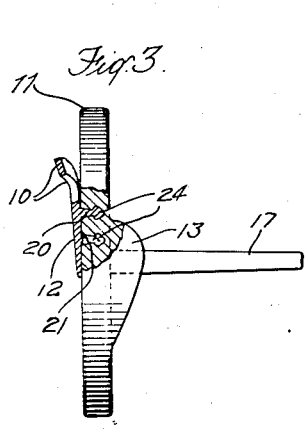
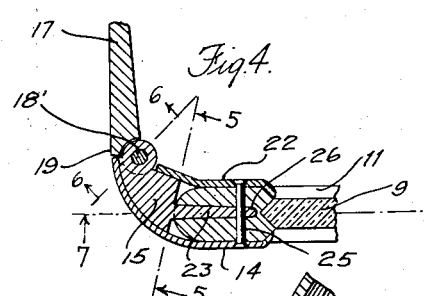
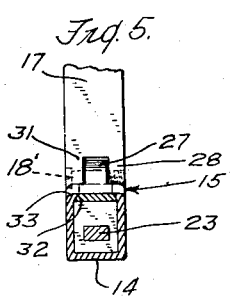
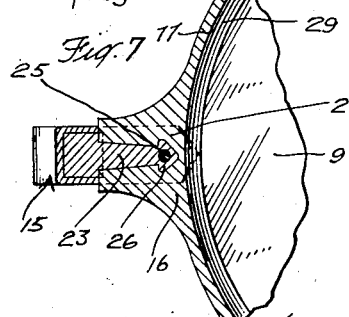
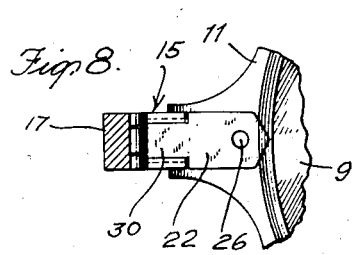
INVENTOR
George E. Nerney
BY Blair & Curtis
his ATTORNEYS Patented Jan. 8, 1935

1,987,206

UNITED STATES PATENT OFFICE 1,987,206

EYEGLASS CONSTRUCTION

George E. Nerney, Attleboro, Mass., assignor to Bay State Optical Company, Attleboro, Mass., a corporation of Maine Application July 26, 1930, Serial No. 470,804

8 Claims. (Cl. 88—53)

This invention relates to eyeglass construction. One of the objects thereof is to provide a practical device of the above nature of simple and durable construction. Another object is to produce in a device of the above nature rigid connections between composition frames and both the bridges and temples. Another object is to provide a device of the above nature of easy manufacture and ready assembly. Another object is to provide a device of the above nature which is of light weight, comfortable in use, and attractive in appearance. Other objects will be in part obvious and in part pointed out hereinafter.

This invention, accordingly, consists in the features of construction, combination of elements, and arrangement of parts which will be exemplified in the following specification, and the scope of the application of which will be indicated in the appended claims.

In the accompanying drawing, in which is shown one of the various embodiments of this invention, Fig. 1 is a front elevation thereof;

Fig. 2 is a top plan view of the parts shown in Fig. 1;

Fig. 3 is a sectional view taken along the line 3—3 of Fig. 1 and showing the bridge connection in detail;

Fig. 4 is a sectional view taken along the line 4—4 of Fig. 1 and showing the temple connection in detail;

Fig. 5 is a sectional view taken along the line 5—5 of Fig. 4 and showing another view of the temple construction;

Fig. 6 is a sectional view taken along the line 6—6 of Fig. 4 and showing in detail the central portion of the temple connecting device as herein described;

Fig. 7 is a sectional view taken along the line 7—7 of Fig. 4 and showing in detail the immediate temple connecting means;

Fig. 8 is a side elevation showing in detail the rear wing construction of the temple connecting means.

Similar reference characters refer to similar parts throughout the several views of the drawing.

Referring now to this drawing in detail, there are shown eyeglasses of the frame type, comprising lens 9, bridge 10, and temple 17. As the construction upon both sides of the eyeglasses is the same, that upon one side only will be described.

At the rear of rim 11 there is formed upon or rigidly secured thereto the projection, forming a nose resting portion 13. The bridge 10 terminates in a section 12 extending downwardly, flat against the front side of frame 11, so that its lower extremity is directly opposite the nose engaging portion 13. Extending rearwardly from the lower extremity of section 12 are two prongs 20 and 21 which form an integral part of the section 12. At the extremities of the prongs 20 and 21 pointed flanged portions 24 are provided. The upper flanged prong 20 is embedded in the frame 11, while the lower flanged prong 21 extends through the frame 11 into the nose engaging portion 13.

In this manner there is provided a bridge connection which, because of its simple construction, is of easy manufacture and yet provides a rigid and lasting connection. It may be noted here that the expression "rear" means that side of the eyeglasses closest to the eye, and the expression "downward" denotes such a direction with the glasses in use.

Considering now the construction at the outer end of the lens, the front end of the temple 17 is slotted at its center, forming walls 28 upon its opposite sides, as shown in Fig. 7. Extending from the metallic member 15 is an eye 27 whose thickness is reduced so that it may be brought in registry with slot 31. A screw 18 extends through the walls 28 and the eye 27 securing temple 17 to metallic member 15. The end of temple 17 extends outwardly from connecting means 18 to form a stop with metallic member 15, thus preventing the movement of said temple in an outward direction for more than 90°.

The projecting portion 16 of rim 11 extends outwardly at the temple connecting point providing a larger surface for said temple connection. Integral with metallic member 15 is a wing 14 extending across the front face of projection 16 and terminating on the front face of rim 11. The opposite side of metallic member 15 is provided with a channel 32 (see Fig. 5) extending from hinge connection 18 to its inner extremity and having its upper edges turned inwardly to provide grooved walls 33. Extending into channel 32 is a portion 30 of a metallic member, generally indicated at 34, having beveled edges in substantial registry with grooved walls 32. An outer portion 22 of metallic member 34 is bent rearwardly so that it may form a rear wing running flatwise along the rear surface of rim projection 16 and rim 11 and in substantial registry with front wing 14. By this simple construction a saddle is provided consisting of wings 14 and 22 and metallic member 15.

Embedded and secured in the central portion of meallic member 15 is the base 33 of the flanged prong 23. This prong 23 extends through rim projection 16 and into rim 11 in substantial registry with outside wings 14 and 22 so that its flanged extremity 26 is opposite the outer ends of said wings, as shown in Fig. 6. A rivet, or screw, 25 passes through outside wing 14, rim 11, flanged portion 26 of prong 23, and the wing 22, thus forming a rigid connection for said three frame securing means. The rivet 25 is countersunk at its opposite ends in wings 14 and 22.

By a combination of three connected temple securing means and a projecting portion of the rim, a rigid and lasting temple connection is assured. It should be noted that wing 22 might be an integral part of metallic member 15 as many advantageous features are gained by such a construction.

This construction is particularly adapted for use with zylonite frames. In the past, considerable difficulty has been experienced in constructing a rigid securing means for a metal temple or bridge and a zylonite frame. By the above described means of easy manufacture a steadfast connection which will withstand a strain, such as a twisting stress between the rims, is assured. The two wings 14 and 22, forming a saddle, resist any lateral stress, while the flanged prong 23 and the connecting means 25 resist any transverse strain.

Although the various constructions referred to above have been termed "rigid", it is to be understood that the metal and zylonite are not brittle and will yield to a substantial extent, thus aiding in cushioning and permitting adjustment. Furthermore, zylonite is suggested as the preferred frame material, but the advantageous features of this invention remain unchanged if some other form of composition should be substituted for said frame. It is also to be noted that the term "fitting" is used in a broad sense to denote such conventional parts of eyeglass frames as temples, bridges and the like.

Various changes might be made in the construction herein described, and as this invention might be embodied in materially different arrangements, it is to be understood that all matter herein set forth or shown in the accompanying drawing should not be interpreted as illustrative in a limiting sense.

I claim:

1. In eyeglass construction, in combination, a rim, temple connecting means having extended portions forming sides of a saddle for said rim, a flanged prong connected to the body portion of said saddle and extending into said rim and disposed between said wings, and securing means extending through said sides, rim and prong.

2. In eyeglass construction, in combination, a non-metallic rim, an endpiece including a central body portion and a pair of spaced wing portions extending over the opposite sides of said rim, a prong connected to said central portion and extending inwardly into said rim in registry with said side portions, and a pin extending through said rim and connected to all of said portions.

3. In eyeglass construction, in combination, a non-metallic rim, a lens disposed within said rim, said rim having an enlarged projection, an endpiece having a pair of inwardly extending arms to form the opposite sides of a saddle embracing said enlarged projection, the end portion of said arms converging toward each other about the inner portion of said rim to points substantially adjacent said lens, a prong secured to the body portion of said endpiece and extending into said enlarged projection of said rim in substantial registry with said arms, and a pin extending through said enlarged projection of said rim and through said prong and both of said arms.

4. In eyeglass construction, in combination, a rim having a projection formed thereon, a fitting including a pair of wing-like arms extending over the opposite sides of said projection, the ends of said arms extending inwardly toward each other to grip the inner portion of said rim, and a securing element secured to said arms and extending through said projection.

5. In eyeglass construction, in combination, a rim formed from non-metallic material, a metallic fitting including a pair of wing-like arms extending over the opposite sides of said rim and hooking over the inner side of said rim, said fitting having a prong extending into said rim in registry wth said arms, and a securing element extending through said rim and connected to said arms and said prong.

6. In eyeglass construction, in combination, a rim, a fitting having arms extending over the opposite sides of said rim and a prong extending into said rim in registry with said arms, said prong having a flanged end portion, and a securing element extending through said rim and the end portion of said prong and secured to said arms.

7. In eyeglass construction, in combination, a rim having a peripheral projection formed thereon, a metallic fitting having a pair of arms extending over the opposite sides of said projection and a prong in registry with said arms extending into said projection, and a securing element extending through said projection and said prong and secured to said arms.

8. In eyeglass construction, in combination, a rim having a peripheral projection formed thereon, a metallic fitting having a pair of arms extending over the opposite sides of said projection and a prong in registry with said arms extending into said projection, and a securing element extending through said projection and said prong and secured to said arms, the end portions of said arms extending inwardly toward each other over the inner portion of said rim.

GEORGE E. NERNEY.